(12) United States Patent
Gasche et al.

(10) Patent No.: US 11,046,346 B2
(45) Date of Patent: Jun. 29, 2021

(54) PUSH HANDLE UNIT

(71) Applicant: Wanzl GmbH & Co. KGaA, Leipheim (DE)

(72) Inventors: Thomas Gasche, Leipheim (DE); Dieter Stöckle, Landensberg (DE); Aleksandar Tatic, Ulm (DE); Patrick Heutschi, Binz (CH)

(73) Assignee: WANZL GMBH & CO. KGAA, Leipheim (DE)

( * ) Notice: Subject to any disclaimer, the term of this patent is extended or adjusted under 35 U.S.C. 154(b) by 105 days.

(21) Appl. No.: 16/475,044

(22) PCT Filed: Jan. 17, 2018

(86) PCT No.: PCT/EP2018/051054
§ 371 (c)(1),
(2) Date: Jun. 28, 2019

(87) PCT Pub. No.: WO2018/157990
PCT Pub. Date: Sep. 7, 2018

(65) Prior Publication Data
US 2019/0329810 A1    Oct. 31, 2019

(30) Foreign Application Priority Data
Mar. 2, 2017    (DE) .................... 10 2017 104 407.8

(51) Int. Cl.
*B62B 5/06*    (2006.01)
*B62B 3/14*    (2006.01)

(52) U.S. Cl.
CPC .............. *B62B 5/06* (2013.01); *B62B 3/1416* (2013.01); *B62B 3/1424* (2013.01);
(Continued)

(58) Field of Classification Search
CPC ....... B62B 5/06; B62B 3/1472; B62B 3/1416; B62B 3/1468; B62B 5/067; B62K 11/14;
(Continued)

(56) References Cited

U.S. PATENT DOCUMENTS 3,251,543 A * 5/1966 Bush ...................... A47B 19/00
235/1 R
3,942,822 A * 3/1976 Lewis .................... B62K 21/16
74/551.3
(Continued)

FOREIGN PATENT DOCUMENTS

DE    19734865 A1    2/1999
FR    2470720 A2    6/1981
(Continued)

OTHER PUBLICATIONS

ISA European Patent Office, International Search Report Issued in Application No. PCT/EP2018/051054, dated May 7, 2018, WIPO, 4 pages.

*Primary Examiner* — Jeffrey O'Brien
(74) *Attorney, Agent, or Firm* — McCoy Russell LLP

(57) ABSTRACT

The invention relates to a push handle unit, in particular a multi-piece push handle unit, comprising at least one first and at least one second end piece, each end piece having at least one self-supporting grip unit that rises up, at least one horizontal attachment piece, at least one arcuate corner node, and at least one fastening device for fastening the respective end piece to a transport cart guided by hand, the self-supporting grip unit that rises up consisting at least of one grip unit receptacle (26) and at least of one grip unit insert, the horizontal attachment piece and the grip unit receptacle being formed on the arcuate corner node in such a way that a continuous transition between the horizontal attachment piece and the grip unit is formed by means of the arcuate corner node.

18 Claims, 19 Drawing Sheets

(52) U.S. Cl.
CPC ........... *B62B 3/1428* (2013.01); *B62B 3/1472* (2013.01); *B62B 2202/023* (2013.01); *B62B 2501/065* (2013.01)

(58) Field of Classification Search
CPC ...... B62K 21/12; B62K 21/125; B62K 21/14; B62K 21/145; B62K 21/16; B62K 21/26
USPC .................................. 16/430, 436, 437, 421
See application file for complete search history.

(56) References Cited

U.S. PATENT DOCUMENTS

| | | | | |
|---|---|---|---|---|
| 4,248,441 A * | 2/1981 | Joseph | ....................... | B62B 5/06 16/436 |
| 5,299,816 A * | 4/1994 | Vom Braucke | ....... | B62B 3/1476 280/33.998 |
| 5,425,438 A * | 6/1995 | Sonnendorfer | ........... | G07F 1/06 194/212 |
| 5,595,259 A * | 1/1997 | Gilliland | .............. | B62D 51/001 16/430 |
| 5,836,051 A * | 11/1998 | Myers | ................... | B62B 3/1416 16/436 |
| 5,873,147 A * | 2/1999 | Hintz | ........................ | B62B 5/06 16/426 |
| 6,076,791 A * | 6/2000 | Rand | ..................... | B62B 3/1408 248/229.24 |
| 6,196,947 B1 * | 3/2001 | Anderson | .......... | A63B 21/0552 280/47.38 |
| D482,172 S * | 11/2003 | Johnson | ........................ | D34/27 |
| 6,644,524 B1 * | 11/2003 | Garvin | .............. | A47G 23/0225 224/411 |
| 6,811,174 B2 * | 11/2004 | Luetkemueller | ....... | B62K 21/16 280/274 |
| 6,880,852 B2 * | 4/2005 | Lim | .......................... | B62B 1/20 16/426 |
| 7,036,725 B2 * | 5/2006 | Blaeuer | .............. | G08B 13/1427 235/383 |
| 7,445,228 B2 * | 11/2008 | Henry | ..................... | B62B 7/068 280/639 |
| 7,464,441 B2 * | 12/2008 | Peach | ....................... | B62B 1/18 16/430 |
| 7,895,777 B2 * | 3/2011 | Crum | ....................... | B62B 5/06 40/308 |
| 8,136,275 B2 * | 3/2012 | Sonnendorfer | ....... | B62B 3/1416 40/308 |
| 8,152,062 B2 * | 4/2012 | Perrier | .................. | B62B 3/1416 235/383 |
| D670,060 S * | 10/2012 | Sonnendorfer | ................ | D34/27 |
| D670,061 S * | 10/2012 | Sonnendorfer | ................ | D34/27 |
| D670,062 S * | 10/2012 | Sonnendorfer | ................ | D34/27 |
| D670,063 S * | 10/2012 | Sonnendorfer | ................ | D34/27 |
| 8,336,774 B2 * | 12/2012 | Crum | ................. | G06Q 30/0207 235/383 |
| D681,303 S * | 4/2013 | Sonnendorfer | ................ | D34/27 |
| 8,881,347 B2 * | 11/2014 | Feinstein | ................. | B25F 5/006 16/431 |
| 9,540,023 B2 * | 1/2017 | Sonnendorfer | ........... | B62B 5/06 |
| 9,555,852 B2 * | 1/2017 | Cha | .......................... | B62M 1/12 |
| 10,479,387 B2 * | 11/2019 | Eberlein | ................... | B62B 5/06 |
| 10,526,036 B2 * | 1/2020 | Jadczak | ............... | B62K 21/125 |
| 10,799,406 B2 * | 10/2020 | Minardo | ................. | A61G 5/10 |
| 2001/0047569 A1 * | 12/2001 | Cacciacarne | ............ | B62B 5/06 16/426 |
| 2003/0132614 A1 * | 7/2003 | Kreamer | ............ | A63B 69/0028 280/655.1 |
| 2003/0221283 A1 * | 12/2003 | Myers | ..................... | G09F 21/04 16/110.1 |
| 2003/0229966 A1 * | 12/2003 | Boice | ........................ | B62B 9/20 16/110.1 |
| 2004/0045132 A1 * | 3/2004 | Chen | ....................... | B62K 21/12 16/430 |
| 2004/0231451 A1 * | 11/2004 | Chiang | .................. | B62K 21/12 74/551.1 |
| 2006/0254861 A1 * | 11/2006 | Perrier | .................. | B62B 3/1428 186/26 |
| 2007/0024029 A1 * | 2/2007 | Dotsey | .................... | B62B 9/087 280/642 |
| 2009/0013819 A1 * | 1/2009 | Nicol | ........................ | B62J 17/04 74/551.8 |
| 2009/0314127 A1 * | 12/2009 | Longnecker | ......... | B62K 21/125 74/551.9 |
| 2010/0133768 A1 * | 6/2010 | Sonnendorfer | ........... | B62B 5/06 280/33.992 |
| 2010/0314847 A1 * | 12/2010 | Sonnendorfer | ....... | B62B 3/1416 280/33.992 |
| 2011/0011995 A1 * | 1/2011 | Tridon De Rey | ........ | G09F 3/20 248/214 |
| 2011/0131846 A1 * | 6/2011 | Crum | .................... | B62B 3/1428 40/308 |
| 2011/0203076 A1 * | 8/2011 | Sonnendorfer | ........... | H05F 3/00 16/110.1 |
| 2011/0215549 A1 * | 9/2011 | Plainfield | ............... | B62K 21/12 280/270 |
| 2011/0221149 A1 * | 9/2011 | Crum | .................... | B62B 3/1416 280/47.34 |
| 2013/0305486 A1 * | 11/2013 | Sonnendorfer | ......... | B62B 5/064 16/111.1 |
| 2014/0151971 A1 * | 6/2014 | Workman | ................. | B62B 5/06 280/47.31 |
| 2017/0334510 A1 * | 11/2017 | Petrov | .................... | B62K 19/30 |
| 2020/0164909 A1 * | 5/2020 | Webert | ................... | B62B 3/144 |
| 2020/0223467 A1 * | 7/2020 | Olbrich | ................... | B62B 3/1472 |
| 2020/0247449 A1 * | 8/2020 | Wolfe | ..................... | B62B 3/184 |
| 2020/0247451 A1 * | 8/2020 | Streicher | ................. | B62B 3/14 |
| 2021/0053605 A1 * | 2/2021 | Wieth | ..................... | B62B 5/06 |
| 2021/0061402 A1 * | 3/2021 | Wagner | .................. | B62K 21/26 |

FOREIGN PATENT DOCUMENTS

| | | |
|---|---|---|
| WO | 9948063 A2 | 9/1999 |
| WO | 2012042033 A1 | 4/2012 |

* cited by examiner

PUSH HANDLE UNIT

CROSS-REFERENCE TO RELATED APPLICATIONS

The present application is a U.S. National Phase of International Patent Application Serial No. PCT/EP2018/051054 entitled "PUSH HANDLE UNIT," filed on Jan. 17, 2018. International Patent Application Serial No. PCT/EP2018/051054 claims priority to German Patent Application No. 10 2017 104 407.8 filed on Mar. 2, 2017. The entire contents of each of the above-referenced applications are hereby incorporated by reference for all purposes.

TECHNICAL FIELD

The present invention relates to a push handle unit, in particular a multi-piece push handle unit, with at least one first and with at least one second end piece for fastening the respective end piece to a transport cart guided by hand.

BACKGROUND AND SUMMARY

Transport carts for heavy and bulky goods, such as are to be found at a building supply center or supermarket, are often provided with upward-rising handles. These enable a more natural or more ergonomic placement of the hands when moving the heavily loaded transport cart.

Moreover, upward-rising handles for a more ergonomic handling are also already finding use in transport carts in retail stores, being typically arranged at the ends of a horizontally extending cross bar.

From WO 2012/042033 A1 there is already known a push handle for a transport cart, which in addition to a transversely or horizontally running cross bar also has upward-rising handle pieces at either end of the push handle, these handle pieces being mounted rotatably about a fastening axis, and also being able to be secured in a position.

From EP 0 985 200 B1 there is already known a handle with a middle piece and with two end pieces which can be fastened to the ends of the middle piece, the end pieces having a device for attachment to a transport cart, such as a shopping cart.

Due to the increased forces at play, which result from the upward-rising handle pieces, injuries may occur with the push handle units mentioned in the prior art, especially if they are not used properly.

It would therefore be desirable to modify a push handle unit for a transport cart so that the forces and torques of the upward-rising handle pieces introduced by the user into the push handle unit are on the one hand optimized and on the other hand the user can change his or her hand positioning, and both a vertical and a horizontal grasping is made possible.

The problem which the present invention proposes to solve is to modify a push handle unit for a transport cart of the kind mentioned above in advantageous fashion, especially so that the forces introduced into the push handle unit and the vertical grasping possibility of a push handle unit can be improved.

Accordingly, it is proposed that a push handle unit, in particular a multi-piece push handle unit, is provided with at least one first and with at least one second end piece, wherein each end piece has at least one self-supporting, upward-rising grip unit, at least one horizontal attachment piece, at least one arcuate corner node and at least one fastening device for fastening the respective end piece to a transport cart guided by hand, wherein the self-supporting, upward-rising grip unit consists of at least one grip unit receptacle and at least one grip unit insert, wherein the horizontal attachment piece and the grip unit receptacle are formed on the arcuate corner node in such a way that a continuous transition between the horizontal attachment The invention is based on the basic notion that, by providing the arcuate corner node at which the grip unit, the horizontal attachment piece and the fastening device come together, the material strain in this region of the push handle unit due to an introducing of force and torque can be decreased. Thanks to this configuration of the corner node with no abrupt transitions, an advantageous influence of force and torque is achieved with no abrupt peak loads. This has an especially positive effect in regard to the continuous transition between the horizontal attachment piece and the grip unit (e.g., decreased notch effect), since this makes it possible to minimize the stress concentrations in this already heavily stressed corner region of the push handle unit. Furthermore, the continuous change in direction by means of the configuration of the arcuate corner node brings about a further minimization of the mechanical strain. The minimization of the mechanical strain likewise has a positive effect on the stressing of the fastening device, since this may likewise be improved in its configuration and its structural layout in regard to the minimized mechanical strain. Furthermore, the self-supporting, upward-rising grip unit, which provides a vertical grasping option for the user of the transport cart, can be constructed more easily in the mounted and serviceable condition of the push handle unit and be adapted to one's needs, as well as to ergonomic requirements. This is accomplished in that the grip unit is designed in at least two pieces. Furthermore, the grip unit insert can be exchanged and replaced with no problem, for example when damaged. This can also be done without having to dismantle the push handle unit or the end pieces entirely.

Moreover, it can be provided that the arcuate corner node and/or the horizontal attachment piece and/or the grip unit have the same cross section geometry at least for a portion. Thanks to the same cross section geometry (reduced notch effect), the mechanical loading of these structural elements can be further lowered. Moreover, the same cross section enables a simplification of the connection of these components as well as their manufacturing.

Further, it is conceivable that the fastening device is formed on a curved portion of the arcuate corner node, especially as a single piece. This is effective and advantageous especially for structural and mechanical reasons, since in this way the forces and torques introduced by the self-supporting, upward-rising grip element can be minimized. Thus, the fastening device can be optimized in terms of its choice of materials and its geometry.

Furthermore, it is conceivable that the horizontal attachment piece in the mounted and serviceable condition of the push handle unit is oriented horizontally, so that the horizontal attachment piece, the arcuate corner node and the self-supporting, upward-rising grip unit form a substantially L-shaped arrangement. Thanks to the horizontal orientation of the horizontal attachment pieces, a further horizontally arranged grip unit can be provided. This enhances the variability of use of the push handle unit for the user and thus achieves a better adaptation to his or her ergonomic needs.

Moreover, it is possible for the horizontal attachment piece to consist of at least one horizontal attachment piece receptacle and at least one horizontal attachment piece insert, while the grip unit receptacle and the horizontal attachment piece receptacle are formed on the arcuate corner node, especially as a single piece. As already explained, the horizontal attachment piece may likewise have a grip unit, which is oriented horizontally in the mounted and serviceable condition of the push handle unit. Thanks to the two-piece design of the horizontal attachment piece, the variability in the configuration and in the manufacturing of the horizontal attachment piece can be improved in advantageous fashion. Consequently, the ergonomic needs of the user can be better met. In addition, thanks to the single-piece formation of the grip unit receptacle and the horizontal attachment piece receptacle on the corner node, the structural and mechanical properties of the push handle unit and the introducing of force and torque by the user from the self-supporting, upward-rising grip unit to the push handle unit are improved.

Moreover, it may be provided that the grip unit insert can be inserted and/or shoved and/or clamped and/or latched and/or clipped and/or screwed and/or riveted and/or glued in the grip unit receptacle and the horizontal attachment piece insert can be so inserted into the horizontal attachment piece receptacle, while at least one object holder is formed on the grip unit insert and/or on the horizontal attachment piece insert, especially as a single piece. On the one hand, the above described connection methods ensure a variable, safe, dependable and robust connection of the respectively two-piece horizontal attachment piece and the grip unit. On the other hand, the great variability of these connection methods makes it possible to specifically select the best suited connection method according to the configuration of the horizontal attachment piece and the grip unit.

Likewise, it is conceivable that the object holder is designed as a holder for at least one beverage cup and/or a hand scanner and/or a magnifying glass and/or a grip cap. In particular, the features of the object holder with regard to user friendliness, such as a cell phone holder, significantly improve the use of a transport cart outfitted with this object holder by a user. In addition, the possibility exists of providing an object holder on both upward-rising, self-supporting grip units, which can even further improve the user friendliness of the push handle unit in advantageous manner.

It is further conceivable for the object holder to be designed as a holder for at least one cell phone and/or one tablet computer and/or one e-book and/or one shopping list and/or as a hook and/or as a grab rail.

Furthermore, it is conceivable that a further self-supporting grip unit is formed on the grip unit insert, especially has a single piece, so that the grip units, the arcuate corner node and the horizontal attachment piece form a substantially C-shaped arrangement. By means of the further self-supporting grip unit, an additional grasping option on the push handle unit can be advantageously provided. This makes possible, for example, a definitely easier use of the transport cart, for example for very tall users, since they can adopt a more upright and comfortable posture when pushing the transport cart outfitted with the further self-supporting grip unit. The single-piece formation of the further grip unit in particular improves the stiffness of the component consisting of self-supporting, upward-rising grip unit and the further grip unit attached to it.

Furthermore, it is possible that the first and the second end piece are joined by means of a cross brace, which is formed on the grip unit insert and/or on the horizontal attachment piece insert. The forming of the cross brace on the grip unit insert and/or on the horizontal attachment piece insert increases the stiffness and the stability of the overall push handle unit. The cross brace may also be formed in particular on a respective lug of the grip unit insert and/or the horizontal attachment piece insert. In particular, it is conceivable for the respective lug, which can be inserted into the cross brace, to engage by form fit with the cross brace. Furthermore, the lug may form a torsion lock. In this way, the stability of the push handle unit is increased and at the same time its assembly is easier. Furthermore, the cross brace makes possible in a relatively simple design further advantageous functions for the use of the push handle unit or the transport cart, such as combining a coin deposit system with the cross brace.

In this regard, it may be provided that the cross brace comprises a middle piece, having a coin deposit system and/or a display device. The coin deposit system may be additionally or alternatively designed to provide for the deposit function of the transport cart also on the basis of banknotes. Thanks to this configuration in the middle piece of the cross brace, the push handle unit and the transport cart can be designed ergonomically for the user and be protected in easy fashion, especially against theft. In addition, the display device affords the possibility for an owner of the transport cart to provide for example important usage information or advertising messages for the user in the display field. Moreover, it may be provided that the display device is arranged on the transport cart.

Moreover, it is conceivable that the middle piece has a recessed support surface and a recessed support shoulder for the stowing of small articles, such as at least a slip of paper and/or a key and/or a cell phone and/or a tablet computer and/or an e-book. The arrangement of the support surface and the support shoulder on the middle piece of the cross brace is especially advantageous because in this way valuables such as cell phones or keys can be kept close to the body of the user, on the one hand. On the other hand, thanks to the central stowage options, the user's valuables are always in the immediate field of view of the user, which enhances their feeling of security during the use of the transport cart. The support shoulder and/or the support surface may be rectangular or trapezoidal in shape with rounded corners. Moreover, the support shoulder may be flush by its outer contour with the coin deposit system. Moreover, a height of the support shoulder may amount to roughly 20% to roughly 60%, especially roughly 30% to roughly 50%, of a height of the support surface.

It is also conceivable that the middle piece comprises an object holder in the form of at least three clamping lips made of plastic, especially made of rubber, for clamping at least one plate-shaped object, especially a tablet computer and/or an e-book, onto the support shoulder and/or the support surface. For users of the transport cart, the carrying along of a cell phone, an e-book or a tablet computer may greatly facilitate the use of the transport cart, since the current shopping list for upcoming purchases can be stored therein, for example. In order to ensure a safe carrying of the electronic device, the middle piece in addition has an object holder, which should be made of an elastic, shock-absorbing material such as rubber, especially in the event of impacts or rear movements of the transport cart. For this, it may be additionally provided that the clamping lips protrude into the support shoulder and/or the support surface. Furthermore, the middle piece may have an object holder in the form of at least one clamp for securing at least one note to the support shoulder and/or the support surface.

Moreover, it is possible for the support shoulder and/or the support surface in the mounted and serviceable condition of the push handle unit to make an angle between around 0° and around 85°, especially between around 0° and around 75°, with a horizontal reference plane. In this way, the tilting of the support shoulder and the support surface can be adjusted in a broad range, which is especially advantageous for the design possibilities of the overall push handle unit.

Further, it may be provided that the push handle unit is produced from at least one injection-moldable plastic. Thanks to the production from injection-moldable plastic, a cost-effective production of the push handle unit can be achieved. In addition, the weight of the push handle unit or the transport cart can be lowered by the use of one or more plastics (as a composite). For example, it is conceivable to use reinforced or non-reinforced polypropylene or a fiber-reinforced plastic. Moreover, the use of reinforced or non-reinforced polyamide is also conceivable. Basically, every kind of plastic is suitable for this application, especially impact-tough plastic.

Furthermore, it is conceivable that the push handle unit is produced at least partly by means of a 2-component injection molding process and has at least two colors. Thus, e.g., the grip unit receptacle and the grip unit insert may be configured at least partly of different materials. In this way, it is possible, for example, to have different colors for the grip unit receptacle or the end piece on one side and for the grip unit insert on the other side. In this way, it also becomes possible to achieve antistatic measures; thus, for example, the grip unit insert can be made of antistatic materials, or an insulating layer can be provided between the grip unit receptacle and the grip unit insert or the grip unit receptacle. Furthermore, it is also possible for the grip unit insert to be partly, provided with rubber inserts or silicone inserts in order to improve the gripping properties Moreover, the present invention relates to a hand-movable transport cart with at least one push handle unit as described above. The transport cart may be, for example, a shopping cart or a transport cart for building supply centers. Likewise, the transport cart may be designed as a luggage transport cart for airports or train stations.

BRIEF DESCRIPTION OF THE FIGURES

Further details and benefits of the invention shall now be explained more closely with the aid of the exemplary embodiments presented in the drawings.

There are shown.

DETAILED DESCRIPTION

Figure 1A:
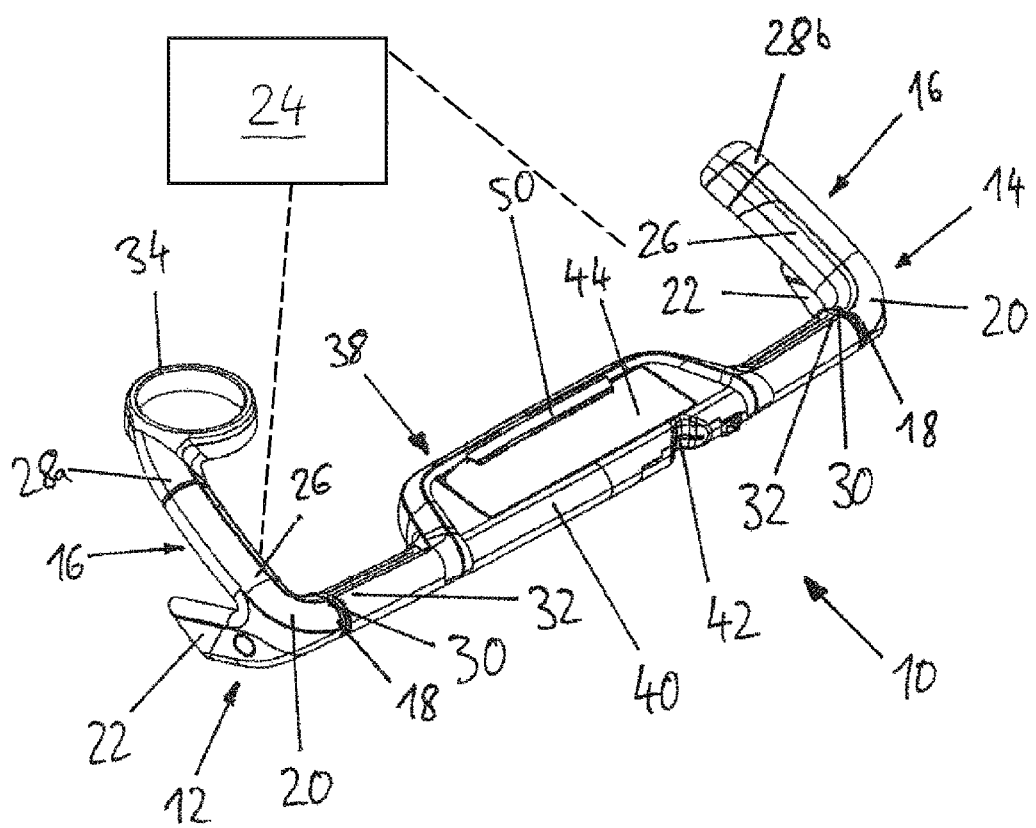
FIG. 1A a perspective representation of a first exemplary embodiment of a push handle unit according to the invention.

FIG. 1A shows in perspective representation a first exemplary embodiment of a push handle unit 10 according to the invention.

The push handle unit 10 is designed as a multi-piece push handle unit 10.

The push handle unit 10 comprises a first end piece 12 and a second end piece 14.

Each end piece 12, 14 further comprises a self-supporting, upward-rising grip unit 16, a horizontal attachment piece 18, an arcuate corner node 20 and a fastening device 22 for fastening the respective end pieces 12, 14 to a transport cart 24 guided by hand.

The self-supporting, upward-rising grip unit 16 consists of a grip unit receptacle 26 and grip unit inserts 28a, 28b.

The grip unit inserts 28a, 28b project in the axial direction of the longitudinal axis of the grip unit receptacle 26 beyond this receptacle.

The grip unit receptacle 26 has a recessed receiving opening, which is set into the end face of the grip unit receptacle 26 facing away from the arcuate corner node 20.

The grip unit inserts 28a, 28b have an inserting portion corresponding to the receiving opening of the grip unit receptacle 26.

Accordingly, the grip unit inserts 28a, 28b can be connected both by force locking and by form fitting to the grip unit receptacle 26.

Moreover, an object holder 34 is formed as a single piece on the grip unit insert 28a.

The object holder 34 consists of a structural element in the shape of a circular ring and an arcuate structural element formed thereon as a single piece, which joins the grip unit insert 28a to the outer surface of the structural element in the shape of a circular ring.

Figure 1B:
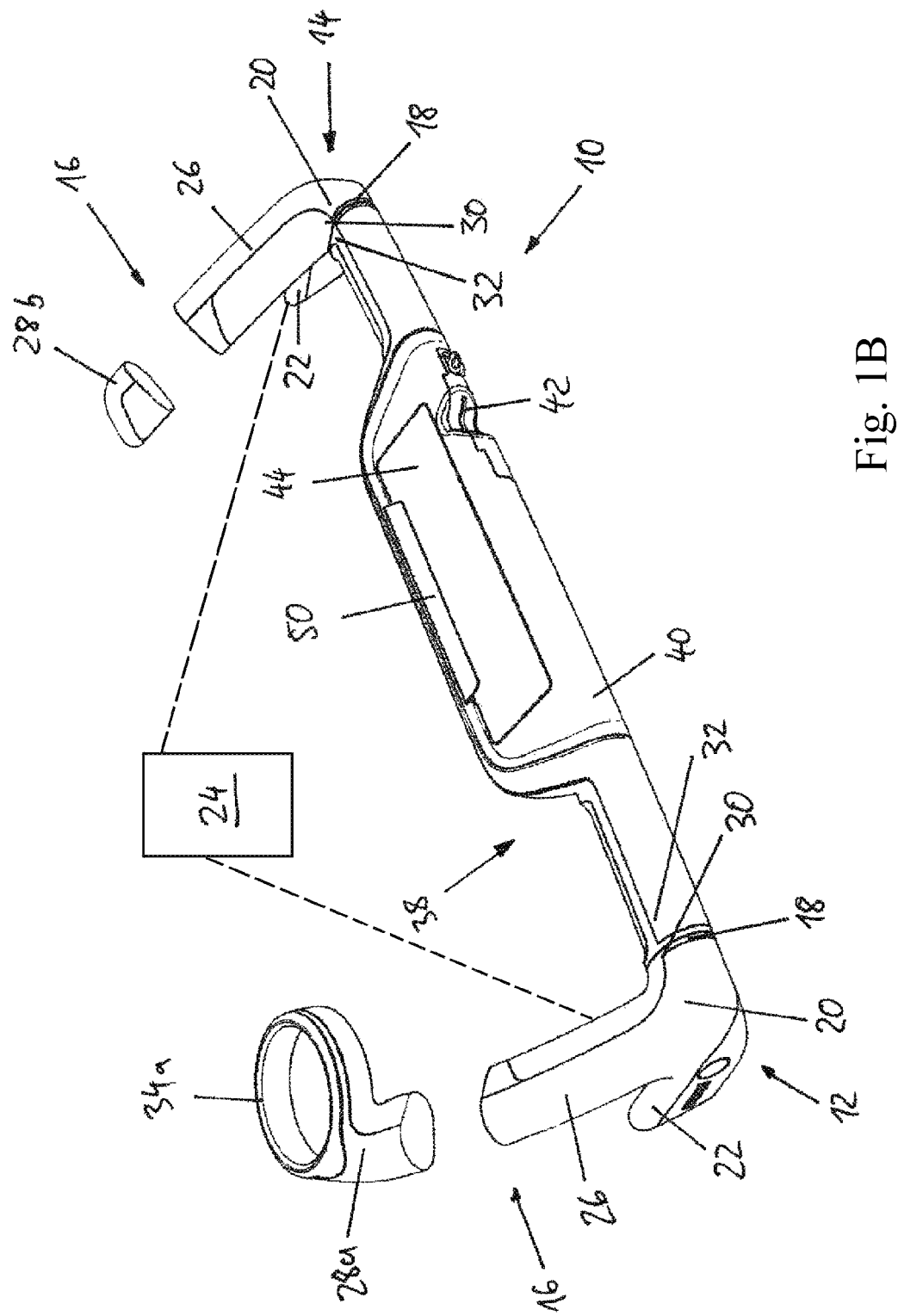
FIG. 1B a further perspective representation of the first exemplary embodiment of the push handle unit.

The object holder 34 is designed as a holder for a beverage cup or for a magnifying glass (see FIG. 1B, object holder 34a with fold-down lid for protecting the magnifying glass).

Moreover, it is conceivable for the object holder to be designed as a holder for a hand scanner, a cell phone, a tablet computer, an e-book or a shopping list.

Moreover, it is conceivable that the object holder is configured as a hook, a grab rail, or a grip cap.

In turn, a grip cap is formed on the grip unit insert 28b as a single piece, having the same cross section geometry as the grip unit insert 28b and the grip unit receptacle 26 and having an end with rounded regions.

The grip unit receptacle 26 and the horizontal attachment piece receptacle 30 are formed as a single piece on the arcuate corner node 20.

The two end pieces 12, 14 of the push handle unit 10 are structurally identical in construction and arranged as mirror images.

The fastening device 22 is formed as a single piece on a curved portion of the arcuate corner node 20.

The fastening device 22 is designed as a tubular body and emerges by means of two arcuate portions at least into the curved segment of the arcuate corner node 20.

The fastening device 22 can additionally emerge by means of the two arcuate portions into the grip unit receptacle 26 and into the horizontal attachment piece receptacle 30.

At the end of the fastening device 22 which is formed as a single piece on the push handle unit 10, two horizontally extending boreholes or threaded bores are made to receive a fastening pin, fastening bolt, or fastening screw of the transport cart 24.

The horizontal attachment piece 18 and the grip unit receptacle 26 are formed on the arcuate corner node 20 in such a way that a continuous transition between the horizontal attachment piece 18 and the grip unit 16 is formed by means of the arcuate corner node 20.

The continuous transition means in this regard that a transition with substantially no change in cross section or a substantially seamless transition is formed between the horizontal attachment piece 18, the corner node 20 and the self-supporting, upward-rising grip unit 16.

Accordingly, the arcuate corner node 20, the horizontal attachment piece 18 and the grip unit 16 have the same cross section geometry for a portion.

The horizontal attachment piece 18 consists of a horizontal attachment piece receptacle 30 and a horizontal attachment piece insert 32. The horizontal attachment piece receptacle 30 may be of such a nature as to receive the horizontal attachment piece insert 32, or the latter may be shoved or inserted into the horizontal attachment piece receptacle 30. The reverse is also conceivable, i.e., the horizontal attachment piece receptacle 30 is inserted into the horizontal attachment piece insert 32.

The horizontal attachment piece insert 32 projects in the axial direction of the longitudinal axis of the horizontal attachment piece receptacle 30 beyond this receptacle.

The horizontal attachment piece receptacle 30 has a recessed receiving opening, which is set into the end face of the horizontal attachment piece receptacle 30 facing away from the arcuate corner node 20.

The horizontal attachment piece insert 32 has an inserting portion corresponding to the receiving opening of the horizontal attachment piece receptacle 30.

Thus, the horizontal attachment piece insert 32 can be connected both by force locking and by form fitting to the horizontal attachment piece receptacle 30.

The horizontal attachment piece 18 in the mounted and serviceable condition of the push handle unit 10 is oriented horizontally.

The horizontal attachment piece 18, the arcuate corner node 20 and the self-supporting, upward-rising grip unit 16 form a substantially L-shaped arrangement.

On the horizontal attachment piece insert 32, a further grip unit likewise extending horizontally is formed flush as a single piece, according to FIG. 1A.

The fastening device 22 and the self-supporting, upward-rising grip unit 16 furthermore form a V-shaped arrangement or an arrangement of an acute angle to each other in the mounted and serviceable condition of the push handle unit 10.

Moreover, in FIG. 1A, the first and second end pieces 12, 14 are joined by means of a cross brace 38.

The cross brace 38 is formed on the respective horizontal attachment piece insert 32.

Moreover, the cross brace 38 comprises a middle piece 40, having a coin deposit system 42 and a display device 44. But it is not absolutely necessary to provide a coin deposit system 42 and a display device 44; it is also conceivable for the middle piece to only have a grab bar.

On the horizontal attachment piece insert 32, in FIG. 1A, the horizontally oriented grip unit is formed as a single piece, extending from the horizontal attachment piece receptacle 30 to the middle piece 40.

The coin deposit system 42 and the display device 44 may be designed as a module, which can be inserted or shoved into the middle piece 40.

The middle piece 40 is formed on the cross brace 38 in the middle between the first and second end pieces 12, 14 as a protrusion.

The respective horizontally oriented grip units are formed on the two ends of the middle piece 40 as a single piece.

The cross brace 38 accordingly comprises at least partially the respective horizontally oriented grip units of the horizontal attachment piece insert 32 bordering on the middle piece 40.

The middle piece 40 moreover has an object holder 50 in the form of a note clip 50.

The note clip is fastened to a frame of the middle piece 40.

The function of the push handle unit 10 may now be described as follows:

The respective transport carts 24 designed for the purpose of use are available to a user in order to carry out various transport tasks at the facilities designed for this, such as retail stores, building supply centers, airports or train stations.

Depending on the usage behavior of the transport cart 24, the user is free to decide, according to his personal proclivities, whether to grasp the push handle unit 10 respectively by the self-supporting, upward-rising grip unit 16 and/or by the horizontally oriented grip units.

Additional functions of the push handle unit 10 are provided by means of the object holders 34, 50, which make the use of the transport cart more convenient for the user.

Thus, for example, the object holder 34 in the form of a beverage cup holder offers him the possibility of carrying along open beverages.

The object holder 34 and the grip cap, as already mentioned above, are formed as a single piece on the grip unit inserts 28a and 28b.

In addition, the grip unit inserts 28a, 28b can be inserted or shoved into the grip unit receptacle 26 and the horizontal attachment piece insert 32 can be inserted or shoved into the horizontal attachment piece receptacle 30.

Moreover, it is also entirely conceivable for the grip unit inserts 28a, 28b to be able to be clamped, locked, clipped, screwed, riveted or glued in the grip unit receptacle 26 and the horizontal attachment piece insert 32 to be able to be so secured in the horizontal attachment piece receptacle 30.

By means of the further object holder 50, for example in the form of a note clip, the user can clamp a shopping list or note paper being carried along in the support surface.

The push handle unit 10 is moreover produced from an injection-moldable plastic.

Moreover, it is conceivable for the push handle unit 10 to be produced at least partly by means of a 2-component injection molding process and to be made in two colors.

FIG. 1B shows a further perspective representation of the first exemplary embodiment of the push handle unit 10.

The exemplary embodiment of the push handle unit 10 according to the invention as represented in FIG. 1B has substantially the same structural and functional features as the exemplary embodiment of the push handle unit 10 represented in FIG. 1A. Only the following structural feature difference shall be pointed out:

The object holder 34a is designed as a holder for a magnifying glass.

Furthermore, the grip unit inserts 28a, 28b are shown schematically in exploded representation.

Figure 2:
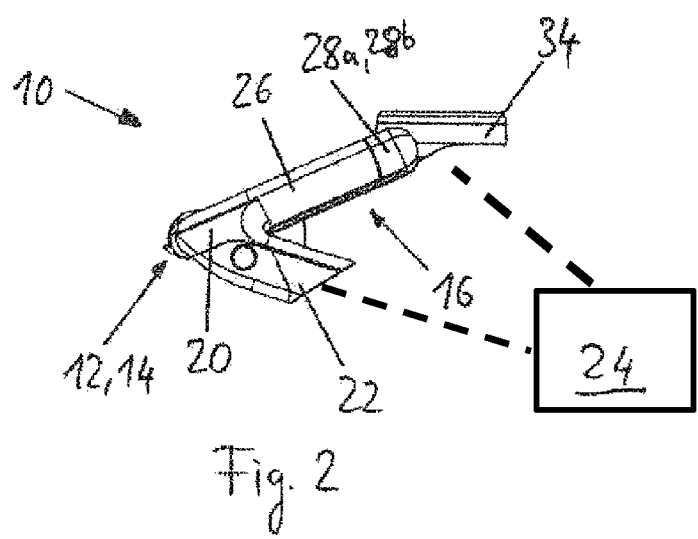
FIG. 2 a side view of the first exemplary embodiment of the push handle unit of FIG. 1A.

FIG. 2 shows a side view of the first exemplary embodiment of the push handle unit 10 of FIG. 1A.

It will be noticed here, in particular, that the object holder 34 in the mounted and serviceable condition of the push handle unit 10 is oriented substantially horizontally.

Figure 3:
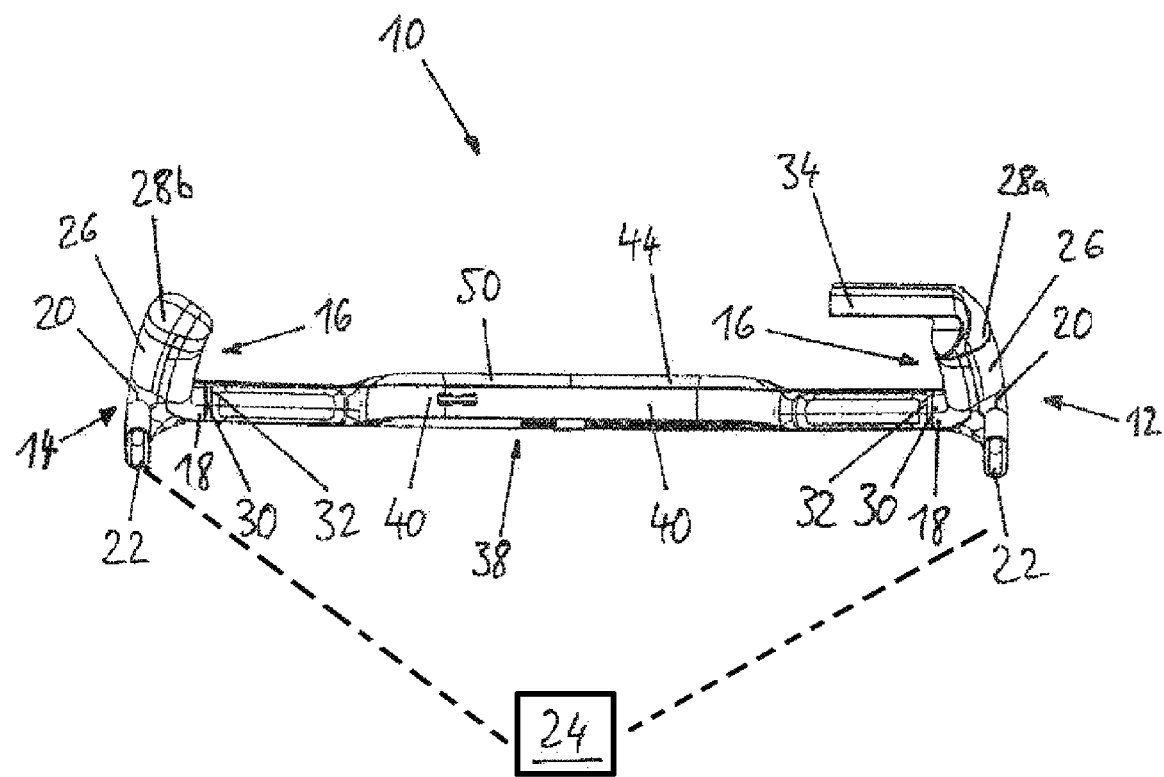
FIG. 3 a front view of the first exemplary embodiment of the push handle unit of FIG. 1A.

FIG. 3 shows a front view of the first exemplary embodiment of the push handle unit 10 of FIG. 1A.

In FIG. 3, the narrow sides of the horizontally oriented grip units facing the transport cart 24 in the mounted and serviceable condition of the push handle unit 10 have elongated recesses made in their surface.

Figure 4:
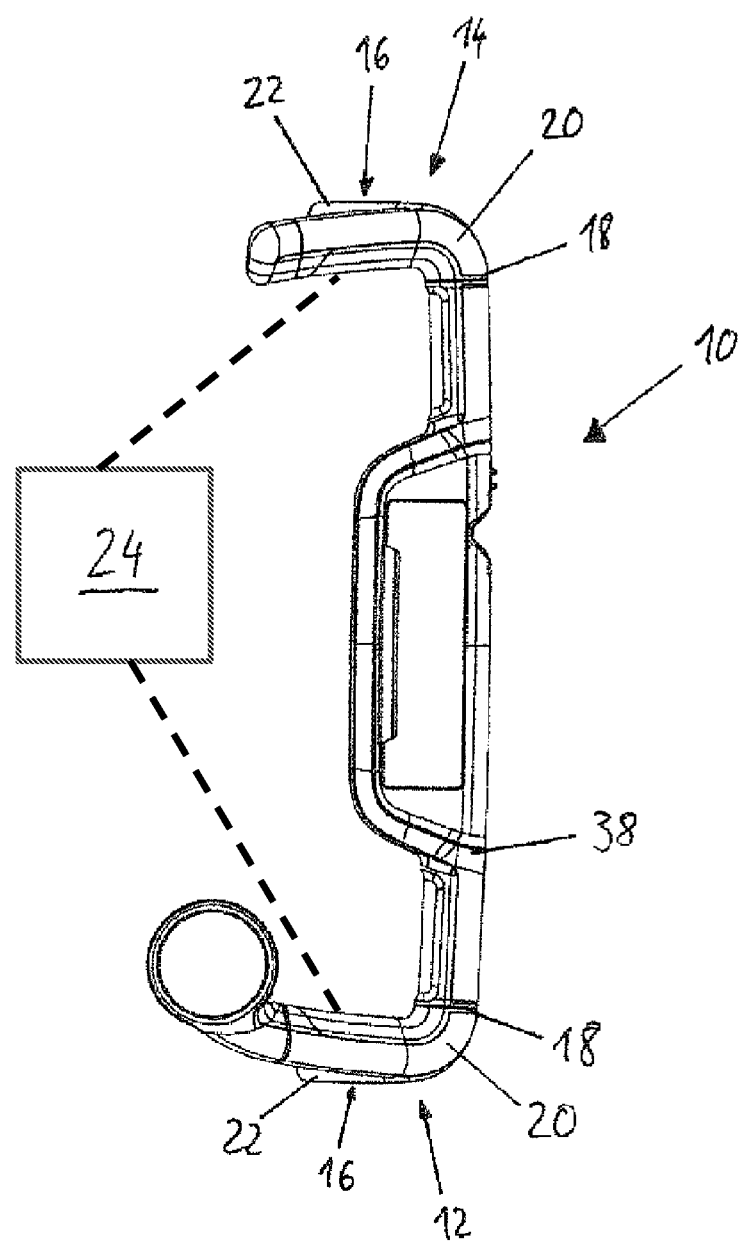
FIG. 4 a top view of the first exemplary embodiment of the push handle unit of FIG. 1A.

FIG. 4 shows a top view of the first exemplary embodiment of the push handle unit 10 of FIG. 1A.

The self-supporting, upward-rising grip unit 16 in the mounted and serviceable condition of the push handle unit 10 makes an angle with the cross brace 38 in the range of roughly 60° to roughly 75°.

Figure 5:
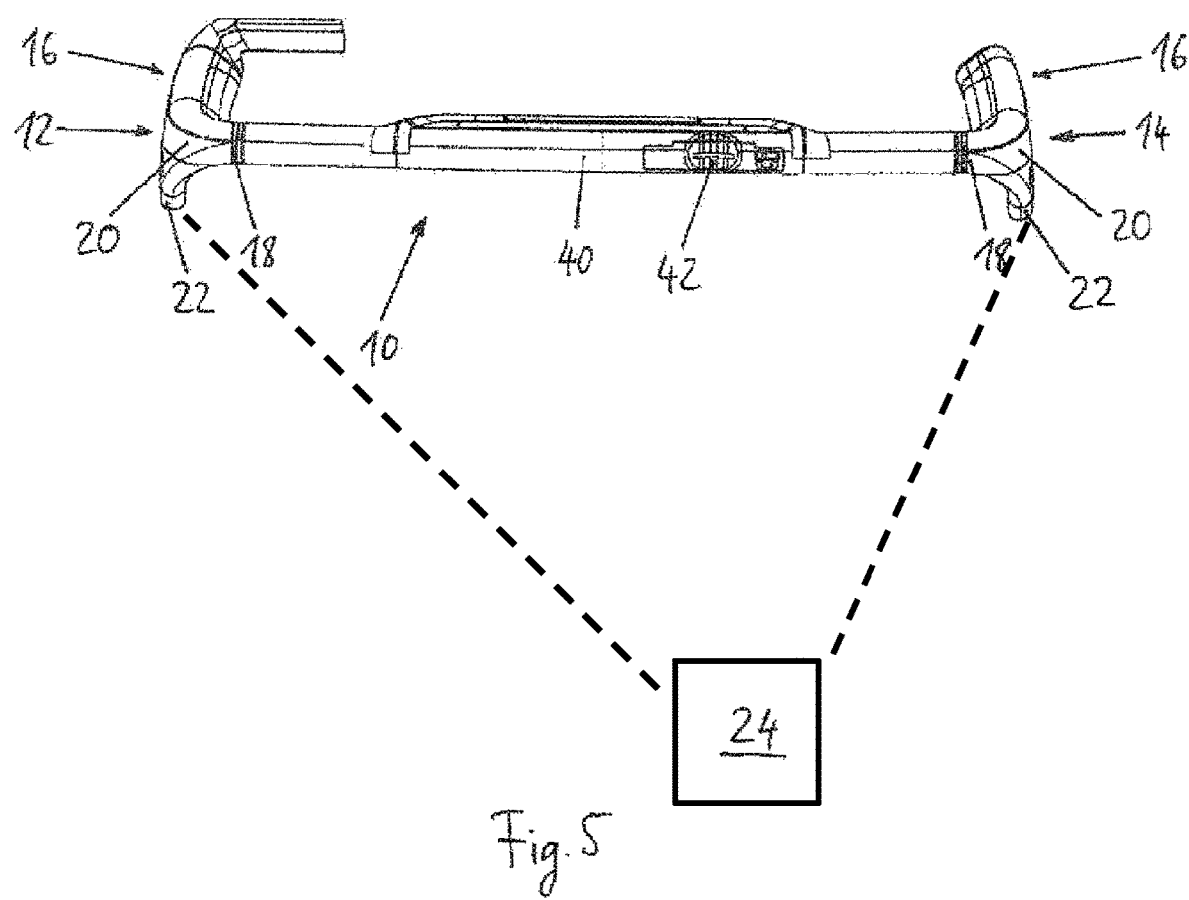
FIG. 5 a rear view of the first exemplary embodiment of the push handle unit of FIG. 1A.

FIG. 5 shows a rear view of the first exemplary embodiment of the push handle unit 10 of FIG. 1A.

The slotlike coin recess of the coin deposit system 42 in the mounted and serviceable condition of the push handle unit 10 is made in the narrow side of the middle piece 40 facing away from the transport cart 24.

On this narrow side of the middle piece 40 there is additionally arranged a shackle for the theft prevention chain (not shown in FIG. 5) horizontally next to the slotlike coin recess of the coin deposit system 42.

Figure 6:
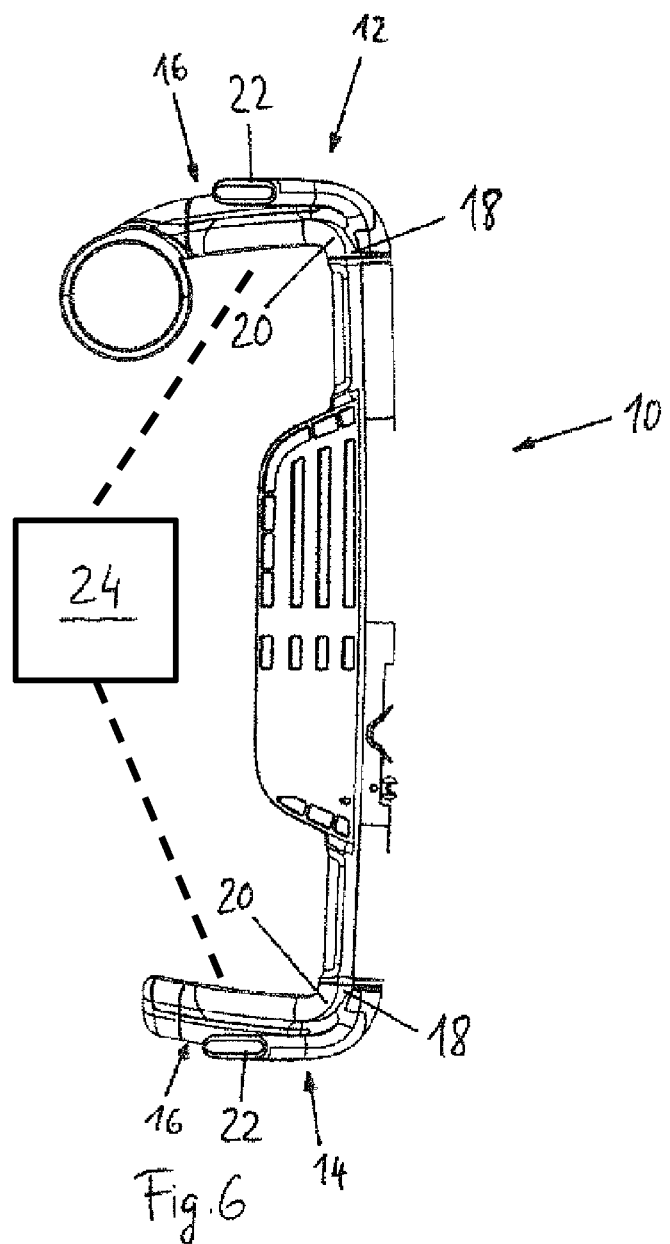
FIG. 6 a bottom view of the first exemplary embodiment of the push handle unit of FIG. 1A.

FIG. 6 shows a bottom view of the first exemplary embodiment of the push handle unit 10 of FIG. 1A.

The fastening device 22 is formed as a single piece on the arcuate corner node 20 by means of a first arcuate portion and by means of a second arcuate portion.

The end of the first arcuate portion is flush with the horizontally oriented grip unit of the horizontal attachment piece 18.

The end of the second arcuate portion is flush with the grip unit 16.

Figure 7:
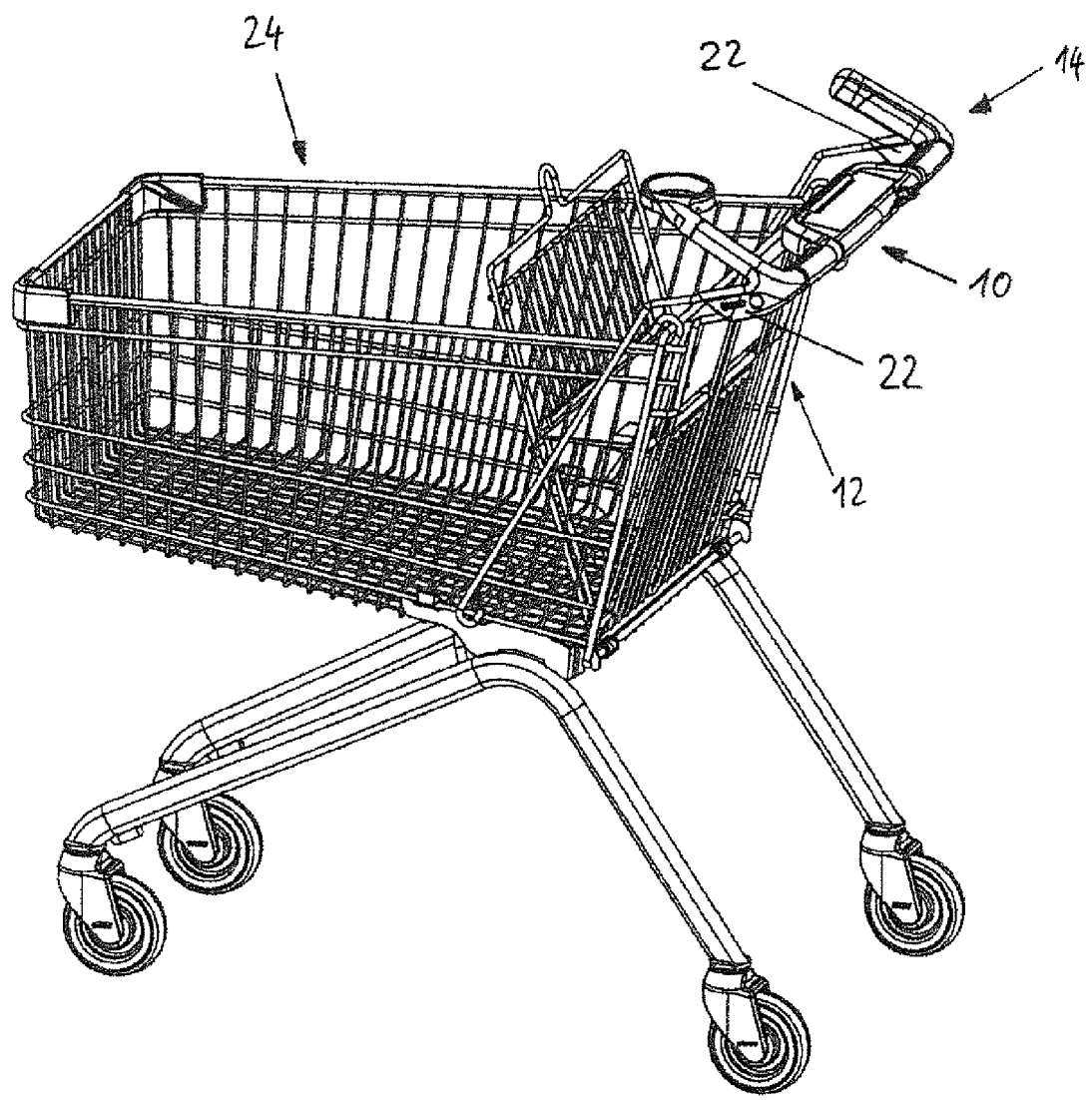
FIG. 7 a perspective representation of the first exemplary embodiment of the push handle unit of FIG. 1A and an exemplary embodiment of a transport cart according to the invention.

FIG. 7 shows a perspective representation of the first exemplary embodiment of the push handle unit 10 of FIG. 1A and an exemplary embodiment of a transport cart 24 according to the invention.

The push handle unit 10 is fastened by means of the fastening devices 22 of the end pieces 12, 14 respectively to two fastening braces of the transport cart, being a shopping cart per FIG. 7.

Inside the fastening device 22, the fastening braces of the transport cart run parallel.

At the end of the fastening device 22 which is formed as a single piece on the push handle unit 10, two horizontally extending boreholes or threaded bores are made to receive a fastening pin or a fastening screw.

The fastening braces running in parallel inside the fastening device 22 meet between the fastening pin or a fastening screw and the end of the fastening device 22 which is formed as a single piece on the push handle unit 10, to form a single-piece fastening brace arc.

By means of the fastening brace arc and the fastening pin or the fastening screw, the push handle unit 10 and the transport cart 24 can be mutually secured.

Figure 8:
FIG. 8 a side view of the first exemplary embodiment of the push handle unit of FIG. 1A and of the exemplary embodiment of the transport cart of FIG. 7.

FIG. 8 shows a side view of the first exemplary embodiment of the push handle unit 10 of FIG. 1A and of the exemplary embodiment of the transport cart 24 of FIG. 7.

Figure 9:
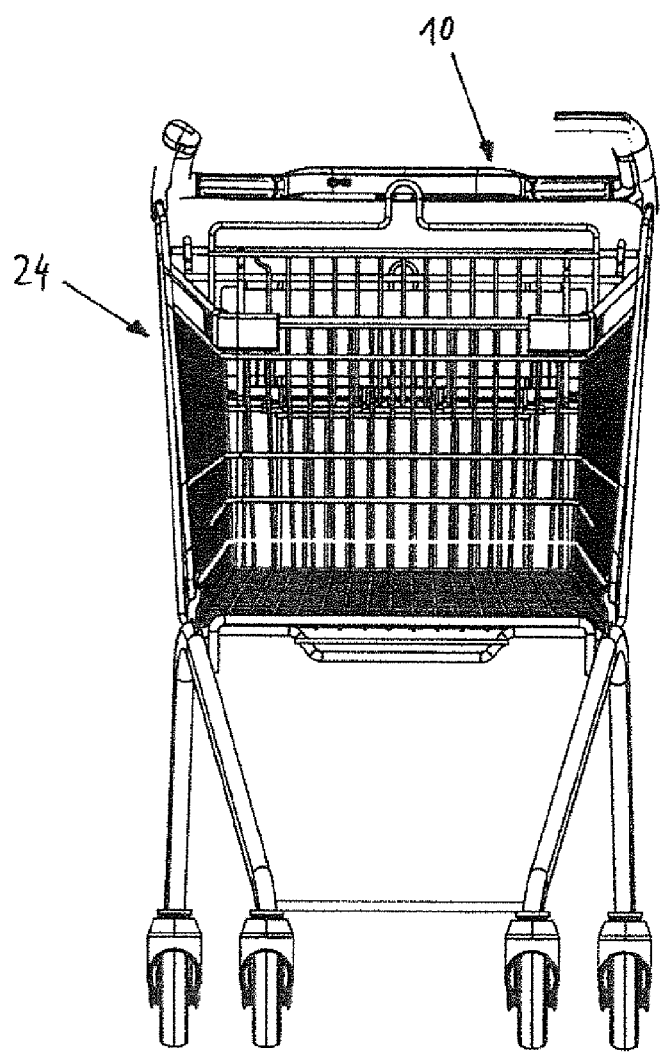
FIG. 9 a front view of the first exemplary embodiment of the push handle unit of FIG. 1A and of the exemplary embodiment of the transport cart of FIG. 7.

FIG. 9 moreover shows a front view of the first exemplary embodiment of the push handle unit 10 of FIG. 1A and of the exemplary embodiment of the transport cart 24 of FIG. 7.

Figure 10:
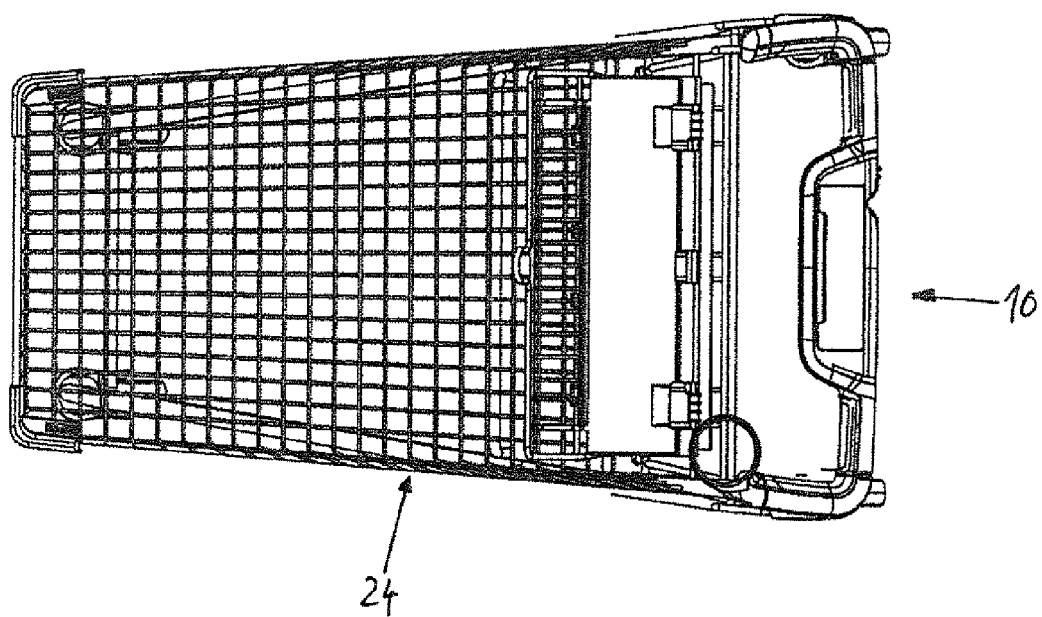
FIG. 10 a top view of the first exemplary embodiment of the push handle unit of FIG. 1A and of the exemplary embodiment of the transport cart of FIG. 7.

FIG. 10 shows moreover a top view of the first exemplary embodiment of the push handle unit 10 of FIG. 1A and of the exemplary embodiment of the transport cart 24 of FIG. 7.

Figure 11:
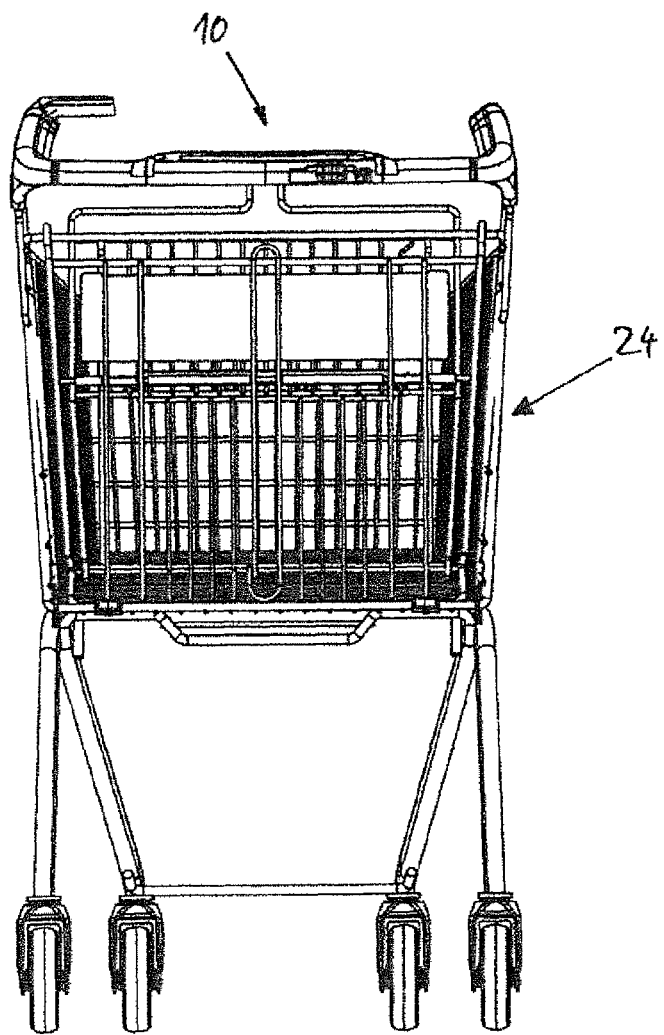
FIG. 11 a rear view of the first exemplary embodiment of the push handle unit of FIG. 1A and of the exemplary embodiment of the transport cart of FIG. 7.

FIG. 11 furthermore shows a rear view of the first exemplary embodiment of the push handle unit 10 of FIG. 1A and of the exemplary embodiment of the transport cart 24 of FIG. 7.

Figure 12:
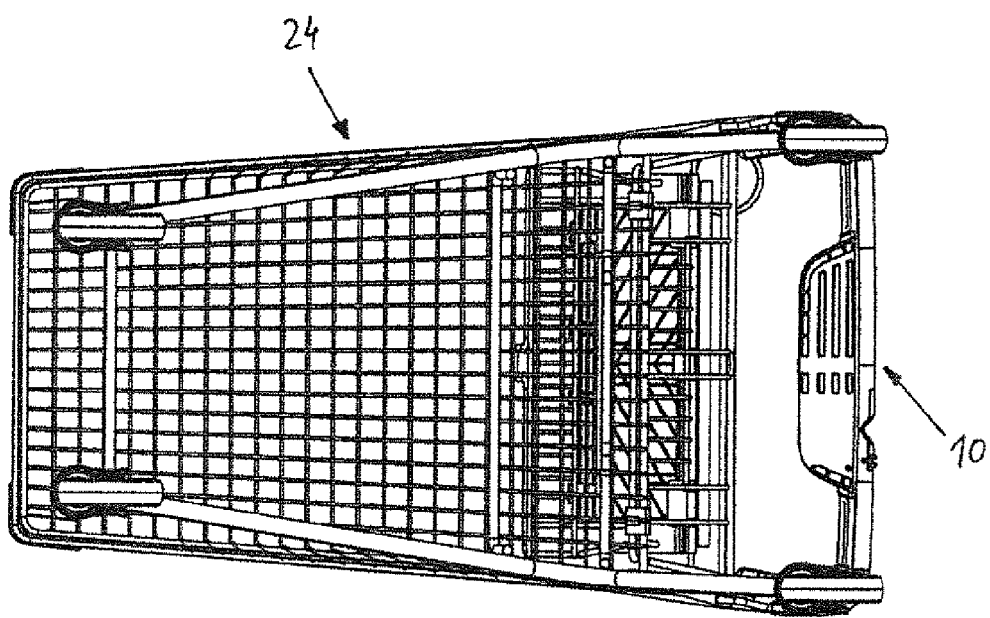
FIG. 12 a bottom view of the first exemplary embodiment of the push handle unit of FIG. 1A and of the exemplary embodiment of the transport cart of FIG. 7.

FIG. 12 moreover shows a bottom view of the first exemplary embodiment of the push handle unit 10 of FIG. 1A and of the exemplary embodiment of the transport cart 24 of FIG. 7.

Figure 13:
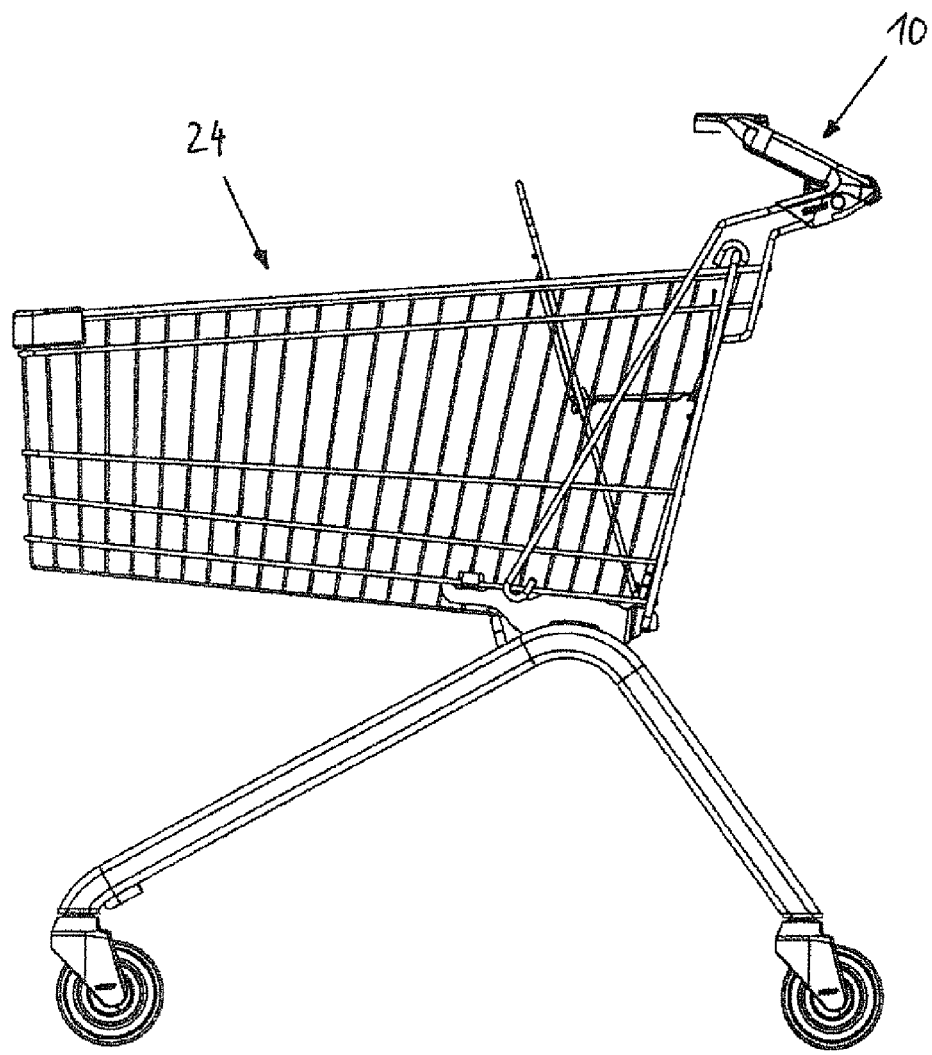
FIG. 13 a further side view of the first exemplary embodiment of the push handle unit of FIG. 1A and of the exemplary embodiment of the transport cart of FIG. 7.

FIG. 13 shows moreover a further side view of the first exemplary embodiment of the push handle unit 10 of FIG. 1A and of the exemplary embodiment of the transport cart 24 of FIG. 7.

Figure 14:
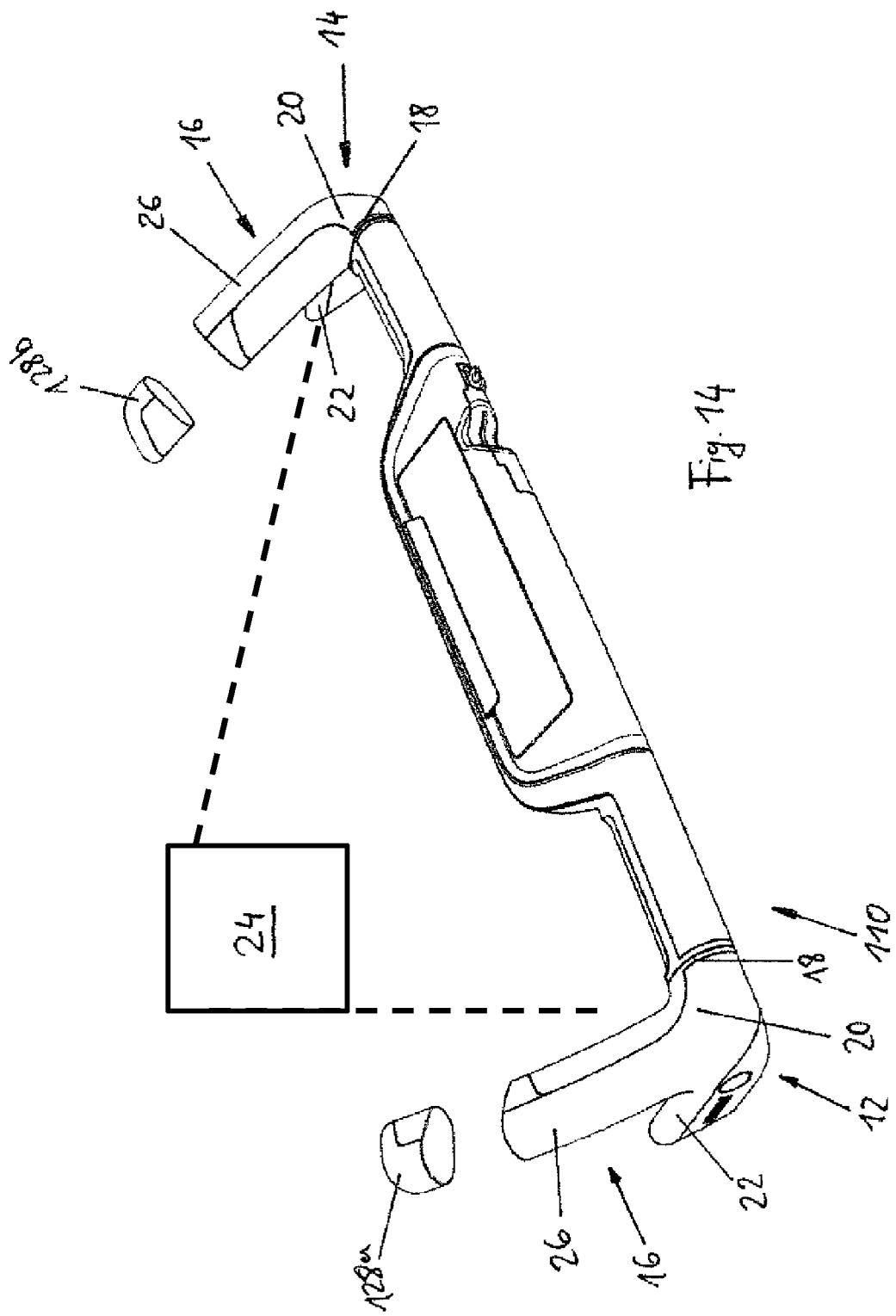
FIG. 14 a perspective view of a second exemplary embodiment of a push handle unit according to the invention.

FIG. 14 shows a perspective view of a second exemplary embodiment of a push handle unit 110 according to the invention.

The exemplary embodiment of the push handle unit 110 according to the invention as represented in FIG. 14 has substantially the same structural and functional features as the exemplary embodiment of the push handle unit 10 represented in FIG. 1A to FIG. 6.

Basically, in assigning the reference numbers (for all the exemplary embodiments), identical or substantially identical features are given identical reference numbers or reference numbers incremented by the value 100.

Only the following structural feature differences shall be pointed out:

A grip cap is formed as a single piece respectively on the grip unit insert 128a and on the grip unit insert 128b, having the same cross section geometry as the grip unit insert 128a, 128b and the grip unit receptacle 26 and having an end with rounded regions.

The grip unit inserts 128a, 128b are shown schematically in exploded representation in FIG. 14.

Figure 15:
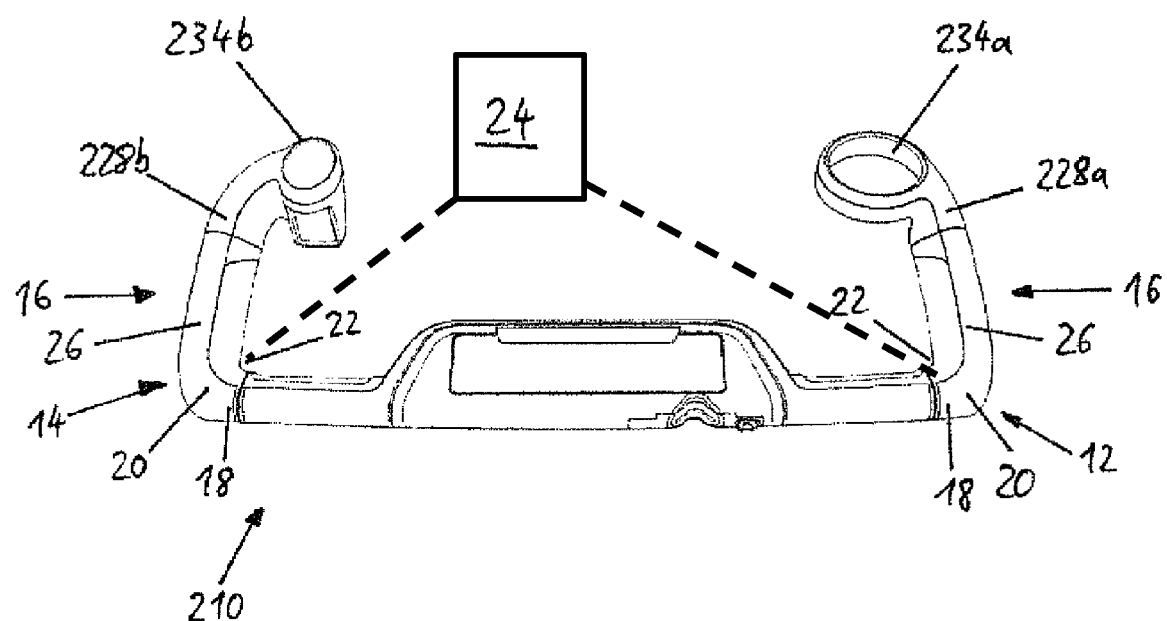
FIG. 15 a perspective rear view of a third exemplary embodiment of a push handle unit according to the invention.

FIG. 15 shows a perspective rear view of a third exemplary embodiment of a push handle unit 210 according to the invention.

The exemplary embodiment of the push handle unit 210 according to the invention as represented in FIG. 15 has substantially the same structural and functional features as the exemplary embodiment of the push handle unit 10 represented in FIG. 1A to FIG. 6.

Only the following structural feature differences shall be pointed out:

Each time an object holder 234 is formed as a single piece on the grip unit insert 228a and on the grip unit insert 228b.

The object holder 234a formed as a single piece on the grip unit insert 228a is designed as a beverage cup holder or a magnifying glass holder.

The object holder 234b formed as a single piece on the grip unit insert 228b is designed as a hand scanner holder.

Figure 16:
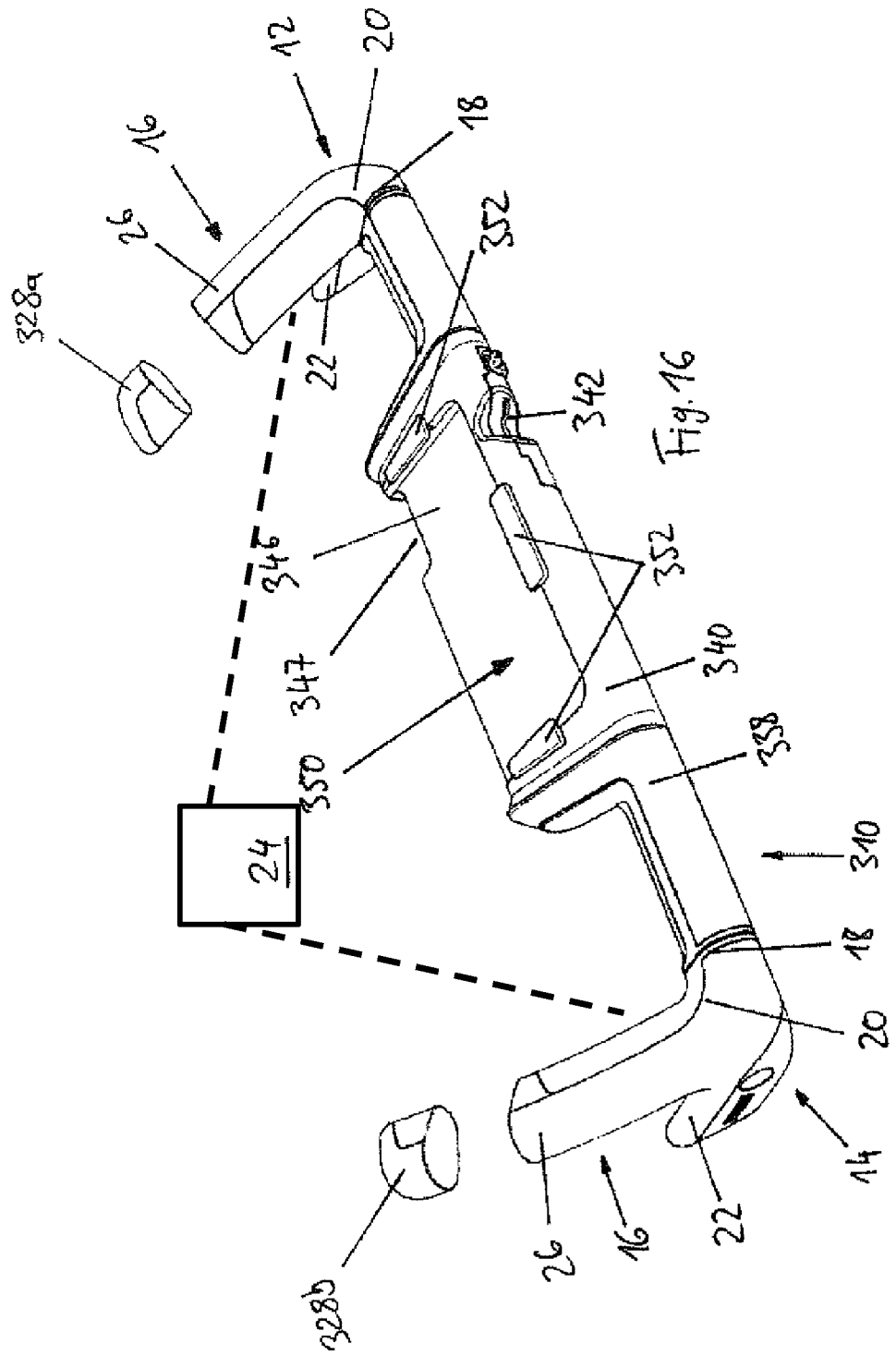
FIG. 16 a perspective view of a fourth exemplary embodiment of a push handle unit according to the invention.

FIG. 16 shows a perspective view of a fourth exemplary embodiment of a push handle unit 310 according to the invention.

The exemplary embodiment of the push handle unit 310 according to the invention as represented in FIG. 16 has substantially the same structural and functional features as the exemplary embodiment of the push handle unit 110 represented in FIG. 14.

Only the following structural feature differences shall be pointed out:

The middle piece 340 of the cross brace 338 has a recessed support surface 346 for the stowing of small articles.

Small articles may be a note, a key, a cell phone, a tablet computer, or an e-book.

Other stowable small articles carried along by the user are likewise conceivable.

Moreover, the middle piece 340 comprises an object holder 350 in the form of three clamping lips 352 made of rubber for clamping a tablet computer or an e-book to the support shoulder 348 or the support surface 346.

The support surface 346 has a recess 347, allowing an element inserted into the support surface 346, such as a tablet computer, to be grasped and thus removed more easily.

The clamping lips 352 are fastened to the middle piece 340 and protrude into the support surface 346 and into the support shoulder 348.

Furthermore, the support shoulder 348 and the support surface 346 in the mounted and serviceable condition of the push handle unit 310 make an angle between around 0° and around 75° with a horizontal reference plane.

Moreover, the grip unit inserts 328a, 328b of FIG. 16 are shown schematically in exploded representation.

Figure 17:
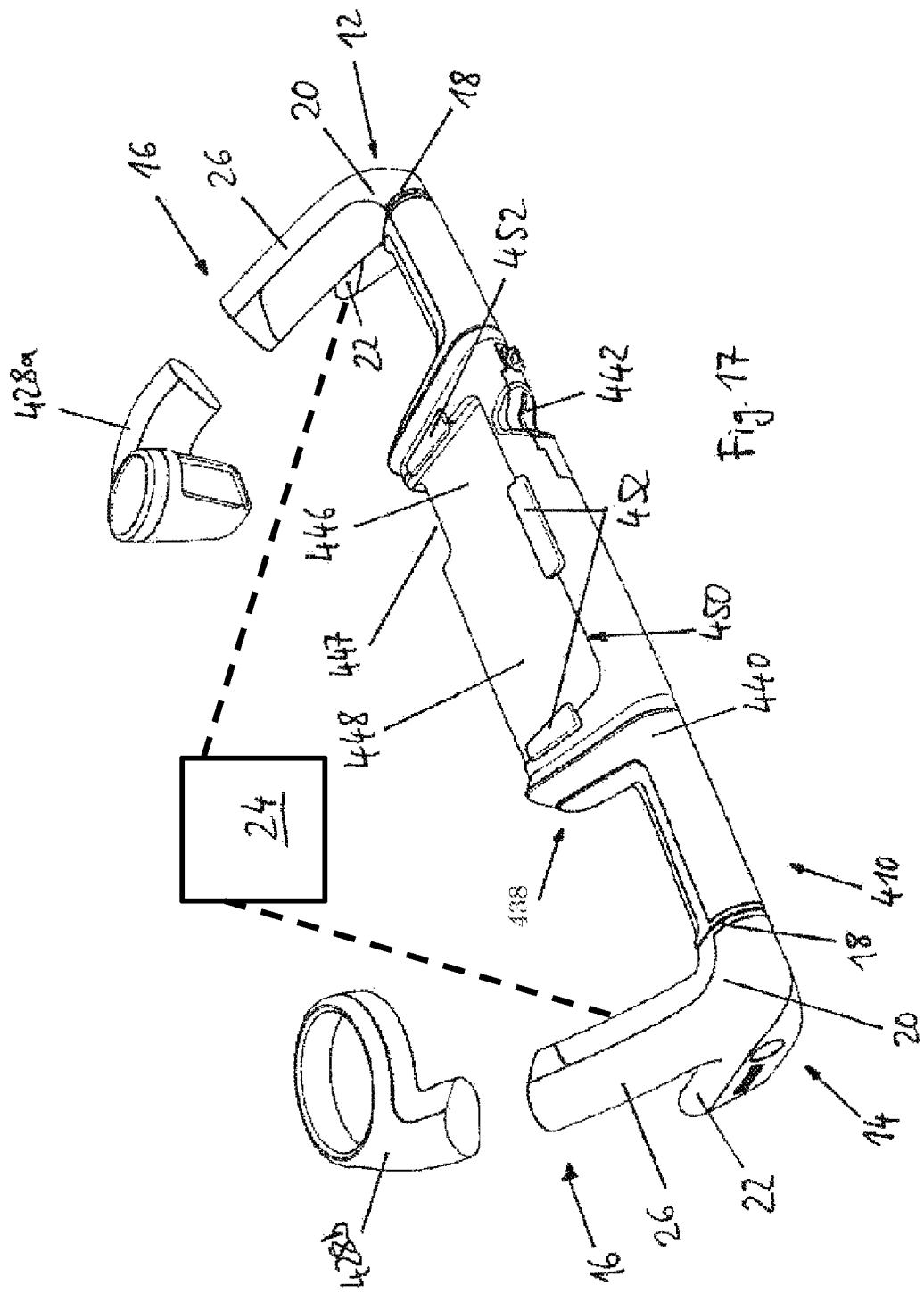
FIG. 17 a perspective view of a fifth exemplary embodiment of a push handle unit according to the invention.

FIG. 17 shows a perspective view of a fifth exemplary embodiment of a push handle unit 410 according to the invention.

The exemplary embodiment of the push handle unit 410 according to the invention as represented in FIG. 17 has substantially the same structural and functional features as the exemplary embodiment of the push handle unit 210 represented in FIG. 15.

Only the following structural feature differences shall be pointed out:

The middle piece 440 of the cross brace 438 has a recessed support surface 446 with a recess 447 and a recessed support shoulder 448 (not visible in FIG. 17) for the stowing of small articles.

Small articles may be a note, a key, a cell phone, a tablet computer, or an e-book.

Other stowable small articles carried along by the user are likewise conceivable.

Moreover, the middle piece 440 comprises an object holder 450 in the form of three clamping lips 452 made of rubber for clamping a tablet computer 54 or an e-book 54 to the support shoulder 448 or the support surface 446.

The clamping lips 452 are fastened to the middle piece 440 and protrude into the support surface 446 and into the support shoulder 448.

Furthermore, the support shoulder 448 and the support surface 446 in the mounted and serviceable condition of the push handle unit 410 make an angle between around 0° and around 75° with a horizontal reference plane.

Moreover, the grip unit inserts 428a, 428b of FIG. 16 are shown schematically in exploded representation.

Figure 18:
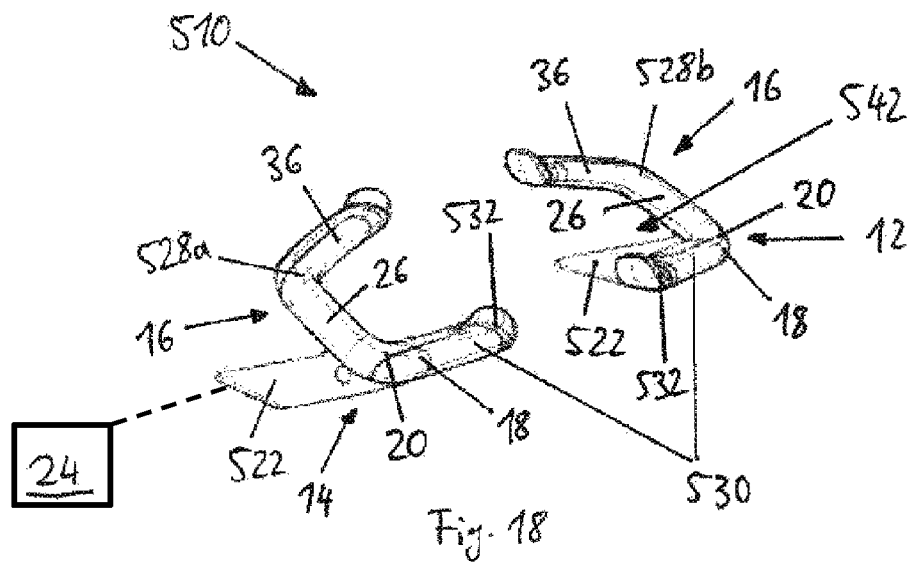
FIG. 18 a perspective representation of a sixth exemplary embodiment of a push handle unit according to the invention.

FIG. 18 shows a perspective representation of a sixth exemplary embodiment of a push handle unit 510 according to the invention.

The exemplary embodiment of the push handle unit 510 according to the invention as represented in FIG. 18 has substantially the same structural and functional features as the exemplary embodiment of the push handle unit 10 represented in FIG. 1A to FIG. 6.

Only the following structural feature differences shall be pointed out:

The first end piece 12 and the second end piece 14 are designed as self-supporting end pieces 12, 14.

The push handle unit 510 accordingly has no cross brace 38 and no middle piece 40 joining together the first end piece 12 and the second end piece 14.

Moreover, the horizontal attachment piece receptacle 530 respectively forms substantially the horizontally oriented grip unit, which is designed as a self-supporting horizontally oriented grip unit.

Moreover, a further self-supporting grip unit 36 is respectively formed as a single piece on the grip unit inserts 528a, 528b.

The grip units 16, 36 of the arcuate corner node 20 and the horizontal attachment piece 18 accordingly form a substantially C-shaped arrangement.

The coin deposit system 542 is furthermore arranged between a grip unit 16 and a fastening device 522 and the shackle for the theft prevention chain is arranged on an outer surface of an arcuate corner node 20.

The fastening device 522 is formed as a single piece both on the corner node 20 and also in addition on the self-supporting, upward-rising grip unit 16 and the horizontal attachment piece 18.

Figure 19:
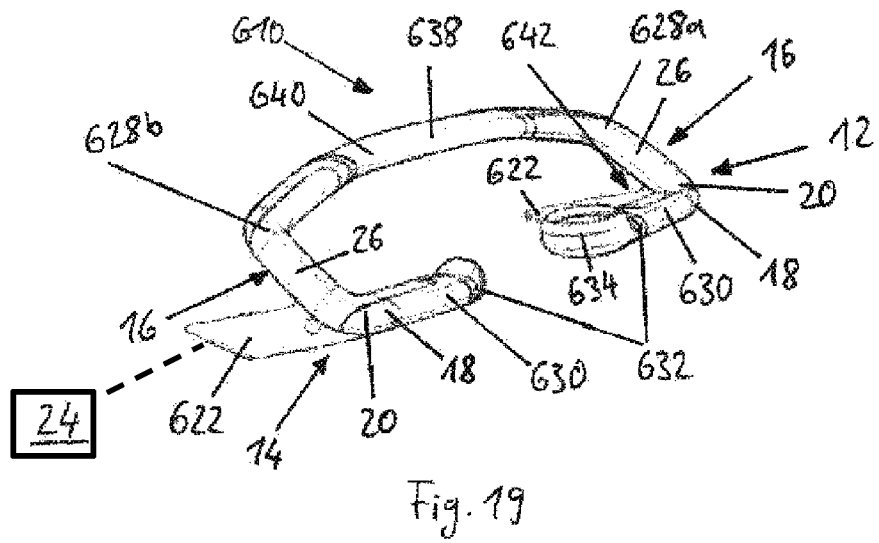
FIG. 19 a perspective representation of a seventh exemplary embodiment of a push handle unit according to the invention.

FIG. 19 shows a perspective representation of a seventh exemplary embodiment of a push handle unit 610 according to the invention.

The exemplary embodiment of the push handle unit 610 according to the invention as represented in FIG. 19 has substantially the same structural and functional features as the exemplary embodiment of the push handle unit 510 represented in FIG. 18.

Only the following structural feature differences shall be pointed out:

A cross brace 638 is formed as a single piece on the grip unit insert 628a and on the grip unit insert 628b, by means of which the first and the second end pieces 12, 14 are joined together.

Furthermore, an object holder 634 is formed as a single piece on a horizontal attachment piece insert 632, whereas a grip cap is formed as a single piece on another horizontal attachment piece insert 632.

The object holder 634 is designed as a beverage cup holder or a magnifying glass holder.

Figure 20:
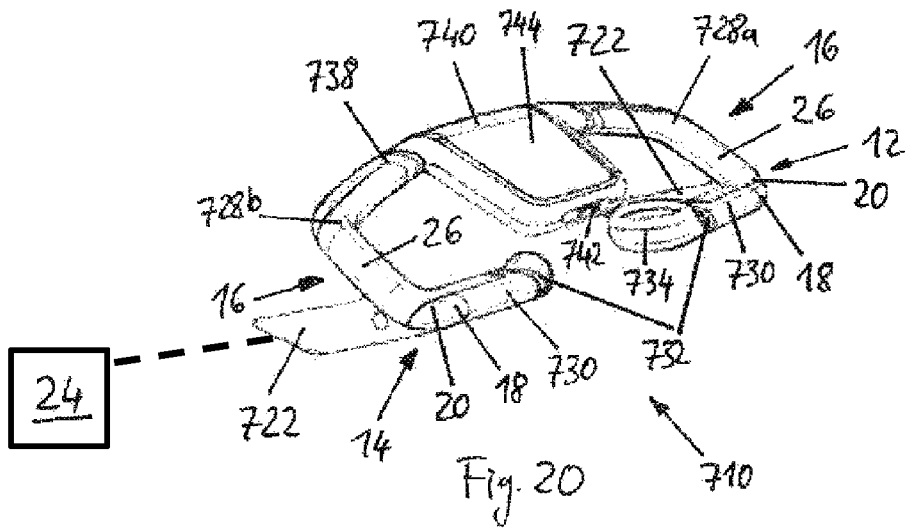
FIG. 20 a perspective representation of an eighth exemplary embodiment of a push handle unit according to the invention.

FIG. 20 shows a perspective representation of an eighth exemplary embodiment of a push handle unit 710 according to the invention.

The exemplary embodiment of the push handle unit 710 according to the invention as represented in FIG. 20 has substantially the same structural and functional features as the exemplary embodiment of the push handle unit 610 represented in FIG. 19.

Only the following structural feature differences shall be pointed out:

The middle piece 740 of the cross brace 738 is designed as a protrusion facing in the direction of the self-supporting horizontally oriented grip units.

The middle piece 740 furthermore has a coin deposit system 742 and a display device 744.

Furthermore, a grip cap is formed as a single piece on both horizontal attachment piece inserts 732.

LIST OF REFERENCE NUMBERS

10 Push handle unit
12 First end piece
14 Second end piece
16 Self-supporting, upward-rising grip unit
18 Horizontal attachment piece
20 Arcuate corner node
22 Fastening device
24 Transport cart guided by hand
26 Grip unit receptacle
28a Grip unit insert
28b Grip unit insert
30 Horizontal attachment piece receptacle
32 Horizontal attachment piece insert
34 Object holder
34a Object holder/magnifying glass holder
36 Further self-supporting grip unit
38 Cross brace
40 Middle piece
42 Coin deposit system
44 Display device
50 Object holder
110 Push handle unit
128a Grip unit insert
128b Grip unit insert
210 Push handle unit
228a Grip unit insert
228b Grip unit insert
234 Object holder
234a Object holder for beverage cup
234b Object holder for scanner
310 Push handle unit
328a Grip unit insert
328b Grip unit insert
338 Cross brace
340 Middle piece
342 Coin deposit system
346 Recessed support surface
347 Recess
348 Recessed support shoulder
350 Object holder
352 Clamping lip
410 Push handle unit
428a Grip unit insert
428b Grip unit insert
438 Cross brace
440 Middle piece
442 Coin deposit system
446 Recessed support surface
447 Recess
448 Recessed support shoulder
450 Object holder
452 Clamping lip
510 Push handle unit
522 Fastening device
528a Grip unit insert
528b Grip unit insert
530 Horizontal attachment piece receptacle
532 Horizontal attachment piece insert
542 Coin deposit system
610 Push handle unit
622 Fastening device
628a Grip unit insert
628b Grip unit insert
630 Horizontal attachment piece receptacle
632 Horizontal attachment piece insert
634 Object holder
638 Cross brace
640 Middle piece
642 Coin deposit system
710 Push handle unit
722 Fastening device
728a Grip unit insert
728b Grip unit insert
730 Horizontal attachment piece receptacle
732 Horizontal attachment piece insert
734 Object holder
738 Cross brace
740 Middle piece
742 Coin deposit system
744 Display device

The invention claimed is:

1. A push handle for a transport cart comprising:
a first monolithic end piece comprising:
a first arcuate corner node;
a first horizontal attachment piece protruding horizontally from the first arcuate corner node;
a first grip extending upward from the first arcuate corner node and relative to the first horizontal attachment piece, the first grip having a first grip receptacle formed in a distal end thereof; and
a first fastening device formed of a tubular body extending from the first arcuate corner node for fastening to the transport cart;
wherein the first grip, the first horizontal attachment piece, and the first fastening device converge at the first arcuate corner node and form a first continuous uniform outer surface;
a second monolithic end piece comprising:
a second arcuate corner node;
a second horizontal attachment piece protruding horizontally from the second arcuate corner node;
a second grip extending upward from the second arcuate corner node and relative to the second horizontal attachment piece, the second grip having a second grip receptacle formed in a distal end thereof; and
a second fastening device formed of a tubular body extending from the second arcuate corner node for fastening to the transport cart;
wherein the second grip, the second horizontal attachment piece, and the second fastening device converge at the second arcuate corner node and form a second continuous uniform outer surface;

a first grip insert configured to be inserted into the first grip receptacle; and
a second grip insert configured to be inserted into the second grip receptacle;
wherein the first horizontal attachment piece extends in a direction of the second monolithic end piece; and
wherein the second horizontal attachment piece extends in a direction of the first monolithic end piece.

2. The push handle for a transport cart as claimed in claim 1, wherein a portion of one of the first arcuate corner node, the first horizontal piece, or the first grip has the same cross sectional geometry as a portion of at least one other of the first arcuate corner node, the first horizontal piece, and the first grip.

3. The push handle for a transport cart as claimed in claim 1, wherein a portion of one of the second arcuate corner node, the second horizontal piece, or the second grip has the same cross sectional geometry as a portion of at least one other of the second arcuate corner node, the second horizontal piece, and the second grip.

4. The push handle for a transport cart as claimed in claim 1, wherein:
the first horizontal attachment piece, the first arcuate corner node, and the first grip form a first substantially L-shaped arrangement; and
the second horizontal attachment piece, the second arcuate corner node, and the second grip form a second substantially L-shaped arrangement.

5. The push handle for a transport cart as claimed in claim 1,
wherein the first horizontal attachment piece comprises a first horizontal receptacle and the second horizontal attachment piece comprises a second horizontal receptacle;
the push handle further comprises a first horizontal insert configured to be inserted into the first horizontal receptacle and a second horizontal insert configured to be inserted into the second horizontal receptacle.

6. The push handle for a transport cart as claimed in claim 5, further comprising an object holder formed on one of the first grip insert and the second grip insert;
wherein the first grip insert is configured to be secured in the first grip receptacle by at least one of clamping, locking, clipping, screwing, riveting and gluing;
wherein the second grip insert is configured to be secured in the second grip receptacle by at least one of clamping, locking, clipping, screwing, riveting and gluing;
wherein the first horizontal attachment piece is configured to be secured in the first horizontal receptacle by at least one of clamping, locking, clipping, screwing, riveting and gluing; and
wherein the second horizontal attachment piece is configured to be secured in the second horizontal receptacle by at least one of clamping, locking, clipping, screwing, riveting and gluing.

7. The push handle for a transport cart as claimed in claim 6, wherein the object holder is configured to hold at least one of a beverage cup, a hand scanner, and a magnifying glass.

8. The push handle for a transport cart as claimed in claim 1, wherein at least one of the first grip insert and the second grip insert comprises a grip cap.

9. The push handle for a transport cart as claimed in claim 5, wherein the first monolithic end piece and the second monolithic end piece are joined by a cross brace; a first end of the cross brace comprises the first horizontal insert and a second end of the cross brace comprises the second horizontal insert.

10. The push handle for a transport cart as claimed in claim 9, wherein the cross brace comprises a middle piece having at least one of a coin deposit system and a display device.

11. The push handle for a transport cart as claimed in claim 10, wherein the middle piece has a recessed support surface and a recessed support shoulder for stowing small articles.

12. The push handle for a transport cart as claimed in claim 11, wherein the middle piece comprises an object holder in the form of at least three clamping lips made of plastic for clamping at least one plate-shaped object onto the support shoulder or the support surface.

13. The push handle for a transport cart as claimed in claim 11, wherein the support shoulder and the support surface extend at an angle between 0 degrees and 85 degrees with respect to a horizontal reference plane.

14. The push handle for a transport cart as claimed in claim 1, wherein the push handle is produced from at least one injection-moldable plastic.

15. The push handle for a transport cart as claimed in claim 1, wherein the push handle is produced at least partly by means of a two-component injection molding process.

16. The push handle for a transport cart as claimed in claim 11, wherein the support shoulder and the support surface extend at an angle between 0 degrees and 75 degrees with respect to a horizontal reference place.

17. The push handle for a transport cart as claimed in claim 11, wherein the middle piece comprises an object holder in the form of at least three clamping lips made of rubber.

18. The push handle for a transport cart as claimed in claim 12, wherein the at least one plate-shaped object is a tablet computer or an e-book.

* * * * *